ELECTROMAGNETIC DELAY LINE HAVING SUPERIMPOSED ELEMENTS
Filed Oct. 24, 1968 3 Sheets-Sheet 1
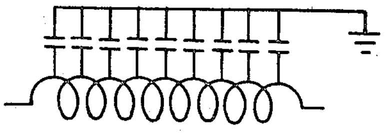
-FIG.1-
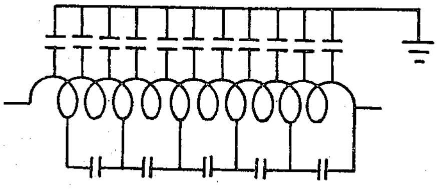
-FIG. 2-
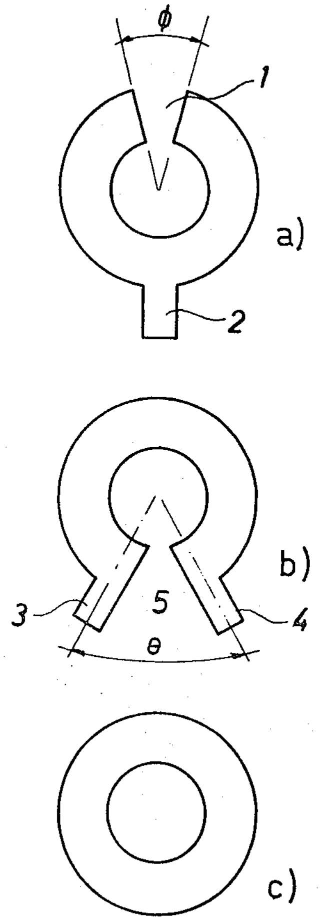
-FIG. 3-
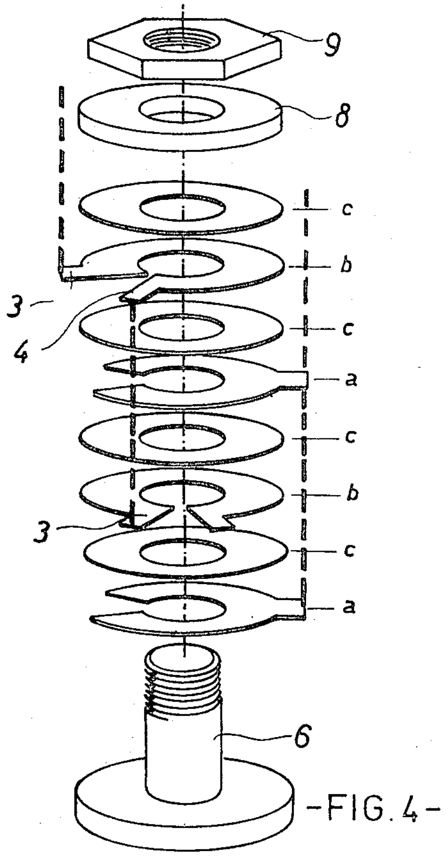
-FIG.4-
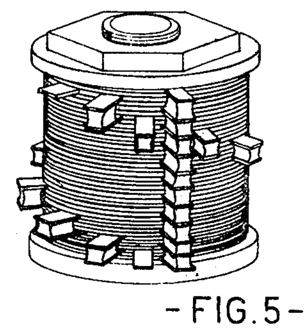
-FIG.5-
INVENTOR.
Georges KASSABGI
BY George V. Eltgroth and
Joseph B Forman
ATTORNEY ELECTROMAGNETIC DELAY LINE HAVING SUPERIMPOSED ELEMENTS
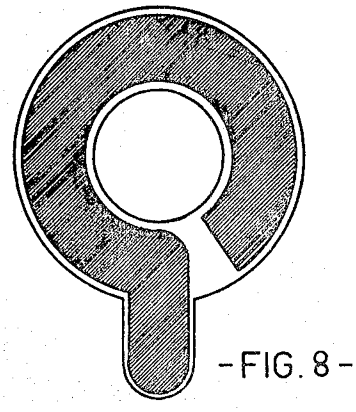
-FIG. 8-
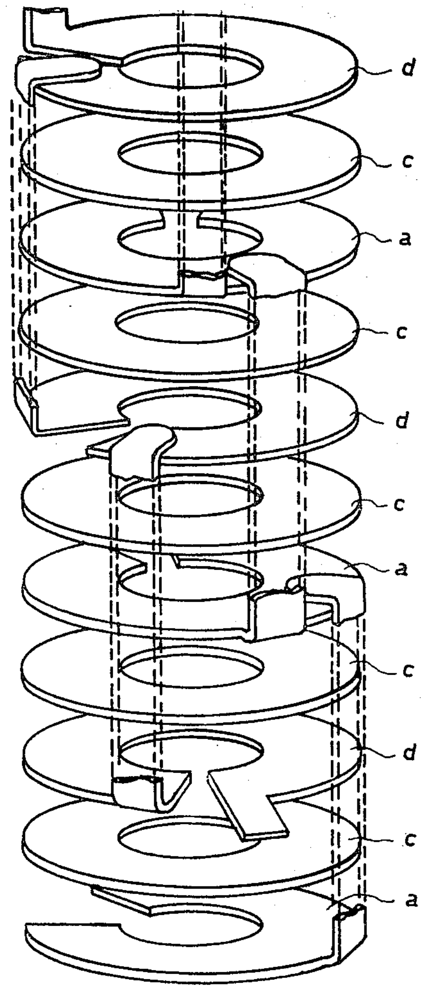
-FIG. 7-
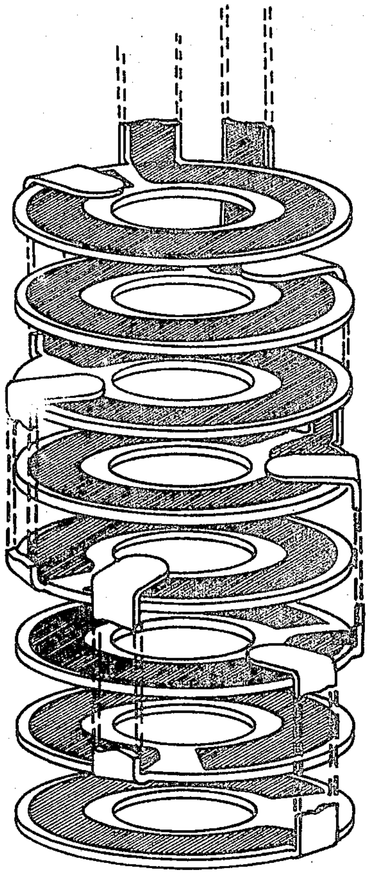
-FIG. 9-
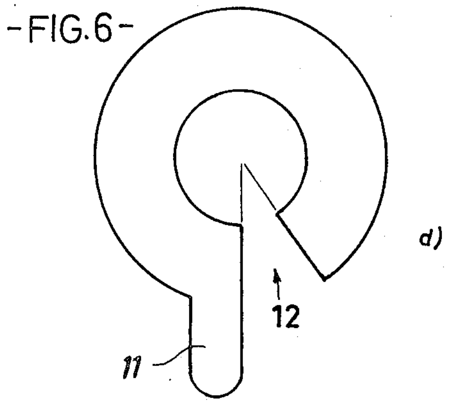
-FIG. 6-
INVENTOR.
Georges KASSABGI
BY George V. Eltgroth and
Joseph B. Forman
ATTORNEYS

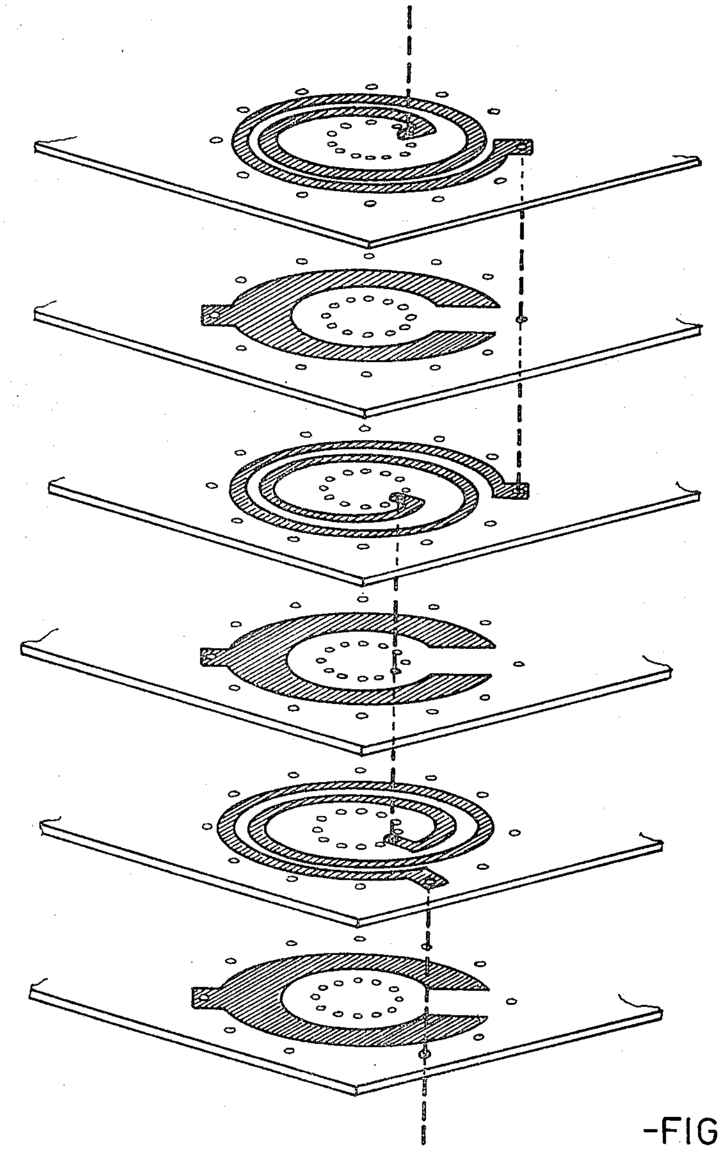
-FIG. 10-
INVENTOR.
Georges KASSABGI
BY George V. Eltgroth and Joseph B. Forman
ATTORNEY United States Patent Office 3,543,194
Patented Nov. 24, 1970

3,543,194
ELECTROMAGNETIC DELAY LINE HAVING SUPERIMPOSED ELEMENTS

Georges Kassabgi, Pregnano Milanese, Milano, Italy, assignor to General Electric Information Systems S.p.A., Caluso, Torino, Italy, a corporation of Italy
Filed Oct. 24, 1968, Ser. No. 770,323
Claims priority, application Italy, Oct. 24, 1967, 814,806
Int. Cl. H03h 7/30
U.S. Cl. 333—31 8 Claims

ABSTRACT OF THE DISCLOSURE

A delay line having distributed parameters is formed by alternately superimposing flat, open-ring shaped conductive elements and flat, ring shaped insulating elements, and by connecting the conductive elements in such a way as to obtain a coil having grounded flat elements interposed between consecutive turns.

The present invention relates to an electromagnetic delay line of the type having distributed parameters.

These delay lines are characterized by the fact that, in contrast to the lumped parameter delay lines, they do not exhibit a true cutoff frequency. Therefore, they can transfer very high frequencies and are widely used in electronic apparatus and more particularly in the field of data handling devices and the like.

The recent developments in the art toward greater operating speeds and component miniaturization impose new requirements and particularly the following ones:

Very high maximum operating frequency
Availability of intermediate outputs to provide different delays
Small space requirement and simple structure
Relatively low characteristic impedance, suitable for transistorized input-output devices.

The prior art delay lines cannot readily fulfill these requirements. Generally they are formed by winding an insulated wire around an insulating core contained in a conductive grounded sheath. In this way, a distributed inductance $l$ and a distributed capacity $c$ (both per unit length) are obtained, as shown by diagram of FIG. 1.

It is known that, if the series resistance and the conductivity to ground may be neglected, the propagation speed of an electric signal on the line is $$V=\sqrt{\frac{1}{lc}}$$

and the characteristic impedance is $$Z=\sqrt{l/c}$$

As long as $l$ and $c$ are independent of the frequency, the speed of propagation does not change with the frequency, and therefore no distortion occurs.

Practically, in the delay lines built as described, the inductance $l$ decreases with frequency, because the currents flowing through consecutive turns are affected by a phase delay, increasing with the frequency, which causes a decrease in the inductive coupling between consecutive turns, and therefore a decrease of the total inductance.

Attempts have been made to obviate this inconvenience by capacitively coupling adjacent or distant turns of the winding so that the delay line is effectively as shown in the diagram of FIG. 2. In the prior art delay lines this result is obtained by means of conductive longitudinal patches located on the insulating core around which the coil is wound. These delay lines are relatively cumbersome and exhibit a rather high impedance, which is not easily calculable.

Furthermore, these delay lines are not easily adaptable to modern methods of making electronic components and circuits, and it is very difficult to mount and integrate them in these circuits.

These inconveniences are prevented in delay lines formed according to the invention, as such delay lines have a very compact and miniaturized structure, are easy to calculate and to design, are provided with intermediate taps, are easily adjusted to the desired value with the utmost precision, and cover a very wide range of delay times.

SUMMARY OF THE INVENTION

A delay line formed according to the invention comprises a first and a second plurality of flat circular conducting elements in the form of open rings provided with connecting tongues, alternately superimposed upon one another with the interposition of flat circular ring-shaped insulating elements, the conducting elements of the first plurality being serially connected to form a multiple-turn winding, and those of the second plurality being parallel connected and grounded.

Thus a coil is obtained wherein each single turn exhibits a definite capacity toward ground.

Other advantages and features of the invention will become apparent from the detailed description of a number of preferred embodiments, with reference to the accompanying drawings.

BRIEF DESCRIPTION OF THE DRAWINGS

FIG. 1 shows the electrical equivalent circuit of a lossless, distributed parameter delay line.

FIG. 2 shows a modification of the circuit of FIG. 1 to compensate for the inductance variations dependent upon frequency.

FIG. 3 shows the elements forming a delay line in a first preferred embodiment.

FIG. 4 is an exploded view of a delay line according to said first embodiment.

FIG. 5 is the assembled delay line according to the first embodiment.

FIG. 6 shows an element for a second embodiment.

FIG. 7 shows an exploded view of a delay line according to said second embodiment.

FIG. 8 shows an element for a third embodiment.

FIG. 9 is the exploded view of a delay line according to said third embodiment.

FIG. 10 is the exploded view of a delay line using a multilayer printed circuit as a support for the elements thereof.

DESCRIPTION OF THE PREFERRED EMBODIMENT

Referring now to FIG. 3, a delay line according to the invention consists of three types of constituent elements: two conductive elements, (*a*) and (*b*), and an insulating element (*c*).

The type (*a*) and type (*b*) elements are made of material having high electrical conductivity, such as copper, silver, gold or aluminum, and may be obtained by shearing from thin metal foils, for example, of a thickness of 35 microns.

The type (*c*) elements are made of dielectric material exhibiting low losses even at high frequencies. Polytetrafluoroethylene, generally known as Teflon, and other like materials are particularly suited for the purpose. The thickness of the insulating elements may be chosen within very large limits such as, for example, 20 to 100 microns, depending upon the desired characteristics of the line. These elements too may be obtained by shearing.

The type ($a$) element is shaped as a circular ring interrupted by a slot 1 having a predetermined angular width $\phi$, and is provided with a small tongue 2 protruding from the outer diameter of the ring.

The type ($b$) element is also shaped as a circular ring having substantially the same dimensions as element ($a$) and being interrupted by a slot 5: two tongues 3 and 4 protrude from the external diameter in immediate proximity of the slot. They form an angle whose value, for example, may be 15°.

The type ($c$) insulating element is shaped as a circular ring, whose internal diameter is slightly less than the minimum internal diameter of elements ($a$) and ($b$) and whose external diameter is slightly larger than the maximum external diameter of elements ($a$) and ($b$). The external and internal diameters may be chosen within very large limits so as to obtain the desired characteristics of the line. For example, the inner internal diameter may be about 6 mm., and the external diameter may be about 10 to 15 mm.

FIG. 4 shows how the elements are assembled to build the delay line. A core 6, made of a suitable insulating material, such as Perspex, Teflon, and the like, is provided with a cylindrical stem, the upper part of which is threaded, and with a retaining head of larger diameter.

The stem diameter is slightly less than the internal diameter of the type ($c$) insulating elements, so that they can be inserted and centered around it. The elements are disposed in the following sequence: first a conductive element ($a$), then an insulating element ($c$), then a conductive element ($b$), then an insulating element ($c$) then a conductive element ($a$), and so on, alternating type ($a$) and type ($b$) conductive elements and interposing an insulating element between consecutive conductive elements.

The type ($a$) conductive elements are so disposed, that all tongues 2 are aligned parallel to the core axis. The type ($b$) conductive elements are so disposed, that, for example, tongue 3 of an element is aligned with tongue 4 of the following, and so on.

When the desired number of elements is assembled, the set of elements is completed by an insulating washer 8 and tightened by a nut 9 which is screwed over the threaded portion of the core.

Subsequently, all tongues 2 of the type ($a$) conductive elements are electrically connected together and to a ground terminal by known methods, such as soldering, thermocompression bonding, and the like.

Furthermore the tongues of type ($b$) elements which are superimposed are connected together two by two, that is, for example, the tongue 3 of an element is soldered to tongue 4 of the following, and so on.

As a result, the type ($b$) elements form a winding having several series connected turns in which a current may flow in all elements in the same clockwise or counterclockwise direction, and which exhibits a definite inductance. Furthermore, each turn has a definite capacity to ground, a ground-connected type ($a$) element being interposed between adjacent turns. A distributed parameter delay line is thus obtained, whose inductance may be easily calculated by means of the formula used for cylindrical coils, and whose capacity may also be calculated by means of the formula used for capacitors having flat parallel plates.

It may be noted that this arrangement lends itself to provide a relatively high capacity, whereas, due to the larger distance between turns, the inductance will in general be lower than one obtained in the known arrangements, under similar condition of space requirement. Therefore a delay line according to the invention, having the same propagation speed as a prior art line, will generally show a much lower characteristic impedance, and therefore is more suitable to be connected to transistorized input-output devices.

The arrangement easily provides a method for obtaining capacitive coupling between adjacent turns, to compensate for the change of inductance with the frequency. In fact, the ($b$) type contiguous elements have portions directly facing each other in correspondence of the slot 1 of the type ($a$) elements, and therefore there is a capacity between turns which may be easily calculated, as the distance between these elements may be assumed to be twice the thickness of the insulating elements ($c$).

The angle $\phi$ of the slot 1 may be chosen so as to obtain the desired value of the inter-turn capacity. The same result may be obtained by choosing, for example, the internal diameter of element ($a$) greater than the internal diameter of element ($b$), and/or the external diameter of element ($a$) as less than the external diameter of element ($b$), so to have external or internal portions of the circular ring of consecutive turns directly facing one another without the interposition of portions of elements ($a$).

It appears that the proposed structure offers a wide variety of parameters on which it is possible to operate in designing the delay line: number of turns, internal and external diameters of the two types of conductive elements, thickness of the insulating elements, and width of slots 1. Delay lines having a delay time in the range from a few nanoseconds to some microseconds, and characteristic impedance easily matched to the input and output transistorized devices may be obtained. In addition, the tongues used for the connection between consecutive type ($b$) elements provide intermediate output taps for obtaining different delay times from a single line or for adjusting the delay to a required value.

If T is the total delay time of the line, and $n$ is the number of type ($b$) elements, all delay times which are a multiple of $T/n$, comprised between $T/n$ and T may be obtained.

Furthermore, since the total of delay time T depends on the thickness of the interposed insulating elements, it is possible to continuously adjust the total delay time within certain limits by more or less adjusting the nut 9 on the stem 6, thus varying the pressure on the set of elements.

If greater delay times, of the order of tens of microseconds, are required, a cylinder of high magnetic permeability and low losses may be introduced in a coaxial cavity of the insulating core, thus increasing the distributed inductance.

If the delay line is relatively long, it may not be possible to achieve a sufficient equalization of the inductance changes with frequency, and it is therefore necessary to subdivide the delay line into magnetically decoupled sections having a length allowing a sufficient equalization.

In the prior art delay line, this decoupling is achieved by spacing the several sections by a distance equal to two or three times the winding diameter, thus causing a substantial increase of the space requirement. In a delay line according to the invention, such decoupling is easily obtained by interposing, between two consecutive sections, conductive elements shaped as circular wafers, without slots.

These conductive rings become a seat of induced currents which reciprocally shield the adjacent sections.

Lastly, it is apparent that it is not necessarily required that the elements be shaped in the form of circular rings as their inner and outer contours may be shaped in the form of any polygonal line, be it regular or irregular or of mixed lines, as deemed useful by reasons of space requirements, mounting ease, or similar reasons.

DESCRIPTION OF ALTERNATIVE EMBODIMENTS

Many variants of the abovementioned structure are possible, and some of these are described hereinafter.

If the conductive elements are made of, or plated with, noble metals such as gold, the electrical interconnection of the type ($b$) elements, and the interconnection of all type ($a$) elements together may be obtained by simple pressure contact. In this case the type (*b*) elements are replaced by the type (*d*) elements of FIG. 6. These type (*d*) elements have a single tongue 11 in the immediate proximity of the slot 12. The type (*a*) elements are substantially the same as in the first embodiment.

The contact between type (*a*) elements is obtained by folding up the tongue of each element in order that it may come in contact with the next adjacent type (*a*) element whose tongue is folded up to make contact with the third type (*a*) element, as shown in FIG. 7. All type (*a*) elements are therefore interconnected. The connection to ground may be achieved by means of one or more additional type (*a*) elements, mounted in direct contact with other type (*a*) elements, whose tongues, not folded up, are used for connection to ground.

The same result may be obtained by using one or more special type (*a*) elements provided with two tongues.

The type (*d*) elements are connected together in the same way: the tongue 11 of the first type (*d*) element is folded up to establish contact with the termination of the second element, near the slot, not provided with the tongue. The tongue of the second type (*d*) element is folded up to establish contact with the termination of the third element, near the slot, not provided with the tongue, and so on. The consecutive type (*d*) elements are rotated consecutively, in the same direction, by a determined angle, to form a winding, as explained in the description of the first embodiment. The input and output terminals and intermediate taps may be obtained by mounting additional type (*d*) elements in contact with the first and last type (*d*) elements, or with intermediate ones. The tongues of these additional elements are not folded up, and are used for the external connection.

It is obvious that said terminals and taps also may be obtained by special type (*d*) elements provided with additional tongues.

A further constructive simplification is obtained by using the type (*d*) element for providing the grounded elements, in place of type (*a*) elements. In this case the grounded elements should be so disposed, that each tongue provides contact with the following element in close proximity to of the tongue of the same, to prevent the formation of a second winding.

To spare space, and in accordance with the modern technical trend of using conductive elements obtained by depositing metallic materials on insulating supports, each conductive element may be formed on an insulating layer, by depositing on a side of an insulating film (for example Teflon), shaped as a circular wafer provided with a tongue, a conducting layer in the form of an open circular wafer also provided with a tongue (FIG. 8).

This technique may be applied for each one of the aforedescribed embodiments, and is particularly useful for the embodiment represented in FIG. 9. In this case, the entire delay line is built by superimposing elements of the same type, varying only the angle by which an element is rotated in respect to the following contacted one, according to whether the element is used to form the winding or the grounded part of the line.

It is known that, in the light of the increasing use of circuits having high component density, and in particular with the application of integrated circuits, a technique of "multilayer" printed circuits is being developed.

In this "multilayer" technique several insulating substrates carrying conductive patterns are superimposed one upon the other, the conductive patterns being selectively connected with the integrated unit terminals traversing the assembly of superimposed substrates through predisposed holed in the substrates. This technique may be used to fabricate delay lines according to the invention, by interconnecting different conductive elements deposited on the different substrates.

FIG. 10 shows, in exploded view, a delay line constructed in this manner. On a first insulating substrate, which is the first layer of the multilayer assembly, a ground element, in the form of an open ring, is deposed together with the other conductive connection pertaining to this layer. Similar elements are deposited on the third, fifth, etc. substrates, and are connected together by means of electrical connections running through proper holes.

On the second, fourth, sixth, etc. layer a conductive element in the form of a flat spiral is deposited, as shown in FIG. 10. These spirals comprise a proper number of turns and are provided with input and output tabs, connected together through holes provided in the intermediate layers; the sense of the spiral being alternatively opposed, so that, when interconnected, a multilayer coil, having a definite sense of winding, is formed.

Several delay lines, as described, may be located in different positions on the same multilayer substrate, to be series connected in order to obtain a single delay line having sufficiently high delay time, and a maximum operating frequency equal to the maximum operating frequency of each one of the single delay lines composing the same.

What is claimed:

1. An electromagnetic delay line, comprising a first and a second plurality of conductive annular elements, said first plurality each including an electrical discontinuity in the annulus, and a plurality of insulating elements, said first and second annular elements being axially superimposed in predetermined relationship to one another and spaced apart by insulating elements, means for connecting the elements of said first plurality serially to form an inductance and means for connecting the elements of said second plurality electrically in parallel with one another.

2. An electromagnetic delay line as set forth in claim 1, wherein the means for electrically connecting the conductive elements include a conductive tongue projecting from each element.

3. An electromagnetic delay line, as set forth in claim 1, wherein said conductive annular elements consist of thin conductive layers adhering to suitable insulating substrates.

4. An electromagnetic delay line, as set forth in claim 3, wherein the means for electrically connecting the conductive elements include a conductive tongue projecting from each element.

5. An electromagnetic delay line, as set forth in claim 2, wherein said conductive elements of said first plurality have substantially the same shape and dimension as the conductive elements of said second plurality.

6. An electromagnetic delay line, as set forth in claim 4, wherein said conductive elements of said first plurality have substantially the same shape and the same dimensions as said conductive elements of said second plurality.

7. An electromagnetic delay line comprising a first and a second plurality of flat conductive elements, the elements of the first plurality being formed substantially as flat spirals, the elements of the second plurality being shaped substantially as open rings, said elements being axially superimposed and spaced apart by insulating elements, the elements of said first plurality being serially connected together, the elements of said second plurality being preselectively interleaved therebetween and connected in a parallel electrical circuit.

8. An electromagnetic delay line as set forth in claim 7, wherein said conductive elements consist of thin conductive layers adhering to suitable insulating substrates.

No references cited

HERMAN KARL SAALBACH, Primary Examiner

T. VEZEAU, Assistant Examiner

U.S. Cl. X.R.

323—76